United States Patent [19]

Hayakawa

[11] 4,384,315
[45] May 17, 1983

[54] PHOTOGRAPHIC FLASH DEVICE FOR USE WITH A SHADOWLESS LAMP FOR SURGICAL OPERATION

[75] Inventor: Yoshito Hayakawa, Kohnosu, Japan

[73] Assignee: Yamada Iryo Shomei Kabushiki Kaisha, Tokyo, Japan

[21] Appl. No.: 293,986

[22] Filed: Aug. 18, 1981

[30] Foreign Application Priority Data

Oct. 31, 1980 [JP] Japan .......................... 55-154871[U]
Feb. 18, 1981 [JP] Japan .......................... 56-20561[U]

[51] Int. Cl.³ .................... G03B 15/05; F21V 33/00; F21V 13/12
[52] U.S. Cl. ........................................ 362/33; 362/5; 362/804
[58] Field of Search .............................. 362/33, 804, 5

[56] References Cited

U.S. PATENT DOCUMENTS

| | | | |
|---|---|---|---|
| 2,911,518 | 11/1959 | Anderson | 362/804 |
| 3,786,244 | 1/1974 | Hutter | 362/33 |
| 4,159,511 | 6/1976 | Dejonc | 362/804 |
| 4,288,844 | 9/1981 | Fisher et al. | 362/33 |

FOREIGN PATENT DOCUMENTS

2018413 11/1979 United Kingdom ................ 362/804

*Primary Examiner*—Irwin Gluck
*Attorney, Agent, or Firm*—Wenderoth, Lind & Ponack

[57] ABSTRACT

The present invention relates to a photographic flash device used with a common still camera in order to photograph a patient's operation under a shadowless lamp. Specifically, the present invention is characterized in that the flash from a stroboscopic unit positioned with the still camera indirectly actuates a flash device housed in the shadowless lamp, thereby causing substantially simultaneous action of a light-emitter of the flash device. For this purpose, the present invention includes a light receiver, like a photo cell, which functions as a synchronous light-emission switch; a focusing reflector which focuses the flash from the stroboscopic unit positioned with the camera and which is located outside the lamp housing and which illuminates and activates the light receiver; a light shielder which prevents the primary reflection beam from the illuminated field of the shadowless lamp from falling onto the light receiver; a charger connected to a power source and the light receiver; and a light-emitter, like a stroboscopic lamp, which is connected to the charger and which emits light in the same direction as that of the shadowless lamp.

8 Claims, 5 Drawing Figures

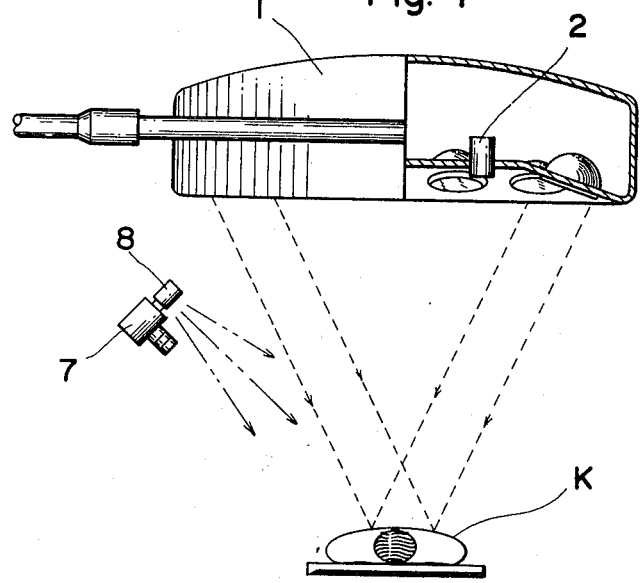
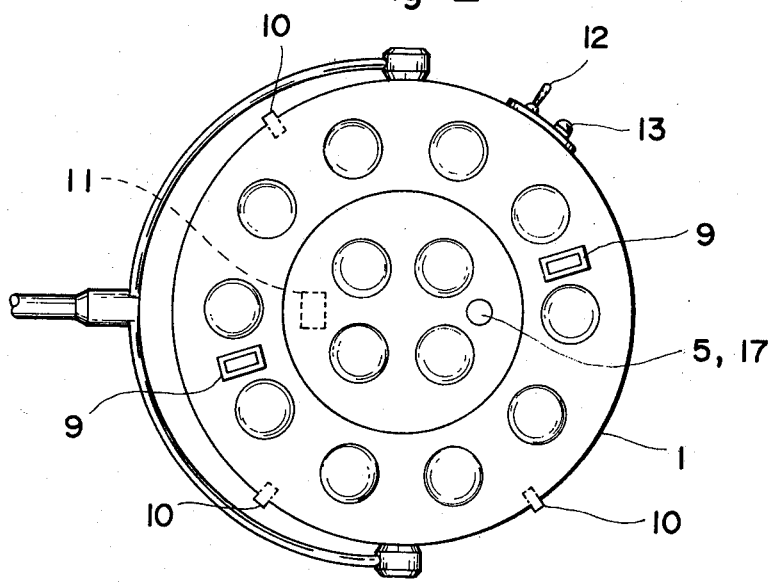

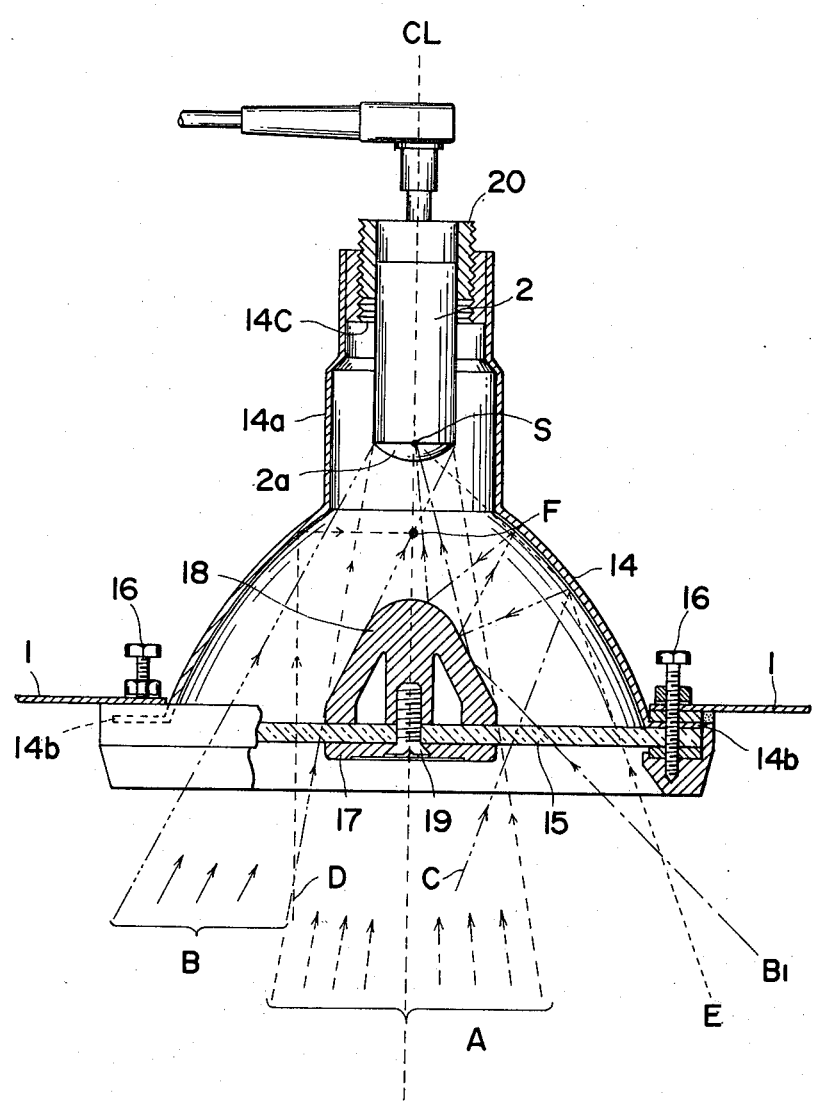

PHOTOGRAPHIC FLASH DEVICE FOR USE WITH A SHADOWLESS LAMP FOR SURGICAL OPERATION

BACKGROUND OF THE INVENTION

In the general practice of photographing with a still camera the part of a patient's body undergoing surgical operation, there are two known methods. In one method, the still camera is built in a shadowless lamp which is used for lighting the operation room and photographs are taken by operating a photographing mechanism attached to the side surface of a lamp-house for the shadowless lamp, while in the other method the still camera to be used for the aforesaid purpose is not built into the shadowless lamp but it functions to photograph the affected part of a patient's body by independently photographing the patient.

Selection of the method depends on the object, photographing conditions, frequency of photographing and other factors.

In the former method, using a still camera built into the shadowless lamp itself, the camera and the stroboscopic lamp are set at a position with respect to the lamp structure where the shooting conditions are optimum for the intended purpose. Thus the former method has the advantage of being able to arrange for optimum lighting for shooting the affected part of a patient's body thus being assured of obtaining the most favorable photograph for a clinical record, and this method has the disadvantage that since the photographs are always taken from a fixed angle or position, multi-angle shooting which is often required is impossible.

By contrast the latter method, using a standard still camera not built into the shadowless lamp, has the advantage of the aforesaid multi-angle shooting being possible but the disadvantage that since the affected part of a patient's body which is to be photographed usually faces the direction of incidence of the light from the shadowless lamp, photographing with an independent still camera positioned at an angle different from the incidence-angle of the light from the shadowless lamp often times can not be performed under adequate lighting and accordingly the resulting photo will not be satisfactory for the clinical record.

Under such circumstances the present invention is related to a photographic flash device to be used together with a shadowless lamp for surgical operation. The device has the advantage that it can be installed in the shadowless lamp and a flash, or light from a stroboscopic unit, positioned in or connected to the independent still camera can be effectively focused on the light-receiving unit of said flash device, thereby assuring the best lighting condition for photography. Heretofore, there has been no device available resembling the flash device for photography under the shadowless lamp lighting as comprehended by the present invention.

SUMMARY OF THE INVENTION

The primary object of the present invention is to provide a device which assures the best lighting for clinical photography in which the affected part of a patient's body under surgical operation is photographed by a common still camera coupled with a stroboscopic unit by the combined use of the flash light from a shadowless lamp and a stroboscopic light unit from the still camera which is not connected to the shadowless lamp.

Another object of the present invention is to provide a device which prevents saturation of the response performance of a light-receiving means and thereby make the action of the light-receiving means substantially improved through an arrangement whereby the light and its reflection from a light-emitting means, such as a stroboscopic unit positioned outside a lamp housing of a shadowless lamp for surgical operation, are substantially focused on a light-receiving means located inside the lamp housing; and a strong primary reflection from the illuniated field of the shadowless lamp is prevented from falling onto the light-receiving means.

To attain these and other objectives the flash device according to the present invention comprises a light-receiving means such as a photocell which functions as a synchronous light-emission switch, and the means is housed in the lamp housing of the shadowless lamp; a focusing reflection means which focuses a flash coming from outside of the lamp housing on said light-receiving means; a light shielding means which prevents the primary reflection beam from the illuminated field of the shadowless lamp from falling onto said light-receiving means; a charging means connected to a power source and said light-receiving means; and a light-emission means, such as a stroboscopic lamp, which is connected to said charging means and emits the light toward the lighting direction of the shadowless lamp.

BRIEF DESCRIPTION OF THE DRAWINGS

These and other objects and advantages of the present invention will become more apparent from the following detailed description made with reference to the accompanying drawings in which:

FIG. 1 is a partially cutaway elevational view of the lamp housing of one embodiment according to the present invention.

FIG. 2 is a bottom plain view of the light-receiver, the stroboscopic lamp and the power supply unit of one embodiment according to the present invention.

FIG. 5 is a partially cutaway elevational view of the light-receiver and the focusing reflection plate of another embodiment according to the present invention.

DETAILED DESCRIPTION OF THE INVENTION

Figure 3:
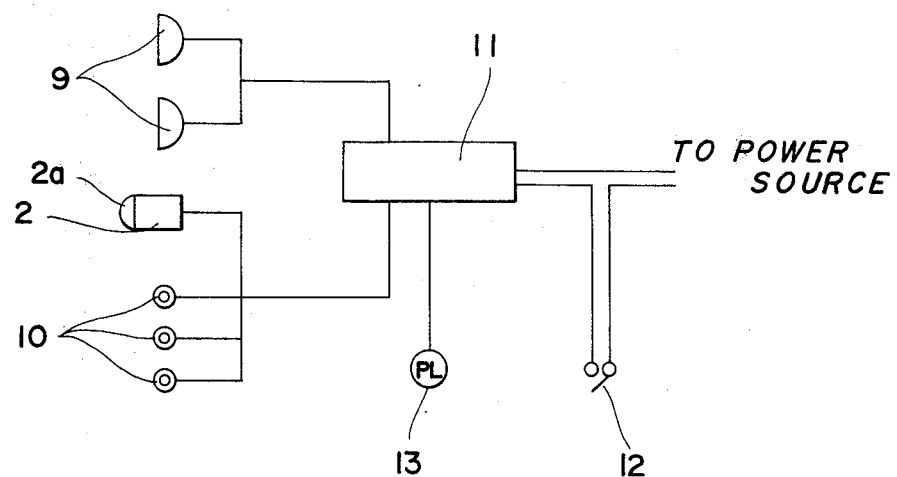
FIG. 3 is a wiring diagram of the flash device according to the present invention.
Figure 4:
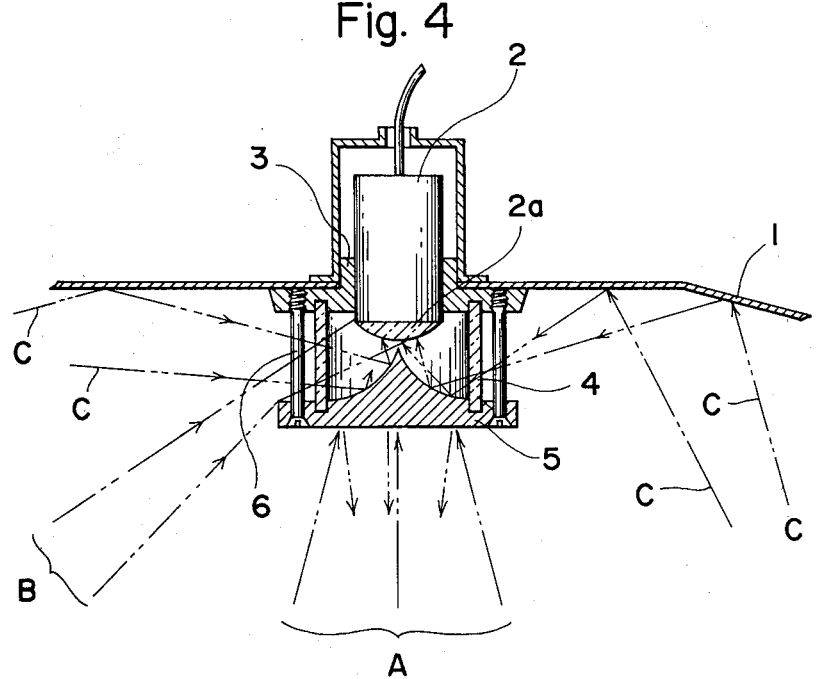
FIG. 4 is a partially cutaway elevational view of the light-receiver and the focusing reflection plate of one embodiment according to the present invention.

Embodiment 1 (FIGS. 1-4)

A light receiver (2) is a light-receiving means which includes a light-sensing unit (2a) positioned on the underside thereof and a trigger circuit built therein is attached thereto by means of a base (3) in the vicinity of the center on the underside of a lamp housing (1) of a clinical multi-unit shadowless lamp. The light sensing unit (2a) is exposed on the underside of said lamp housing (1). Below said light sensing unit (2a) there are fixed by means of a rod (6) to the lamp housing (1) a transparent cylinder (4) which is large enough to cover the periphery of said light sensing unit (2a), and a focusing reflection plate (5) which also functions as a light shielding means.

Said focusing reflection plate (5) is a metal plate having a flat underside, which is large enough to shield a strong primary reflection beam (A) from the object (K)

illuminated by the clinical shadowless lamp and large enough to prevent direct illumination of the light sensing unit (2a) of the light receiver (2) with the primary reflection beam (A), and having a substantially conical top side. The cone formed on the top side of said focusing reflection plate (5) is structured so that it can focus the reflection (C), from a stroboscopic unit (8) positioned in an independent still camera (7), which is not connected to the shadowless lamp, onto the light sensing unit (2a) of the light receiver (2).

On the underside of the lamp housing (1) at positions radially from its center there are installed a pair of stroboscopic lamps (9) such that the flash area of the stroboscopic lamps may overlap the illuminated field of the shadowless lamp.

On the side surface of the lamp housing (1) there are provided an adequate number of plugs (10) so as to connect a wire to the X-contact of the still camera (7).

A power supply unit (11), which functions as a charging means, is held within the lamp housing (1) and is connected respectively to the light receiver (2) each plug (10), each stroboscopic lamp (9), a power switch (12), and a charge pilot lamp (13) located on the side surface of the lamp housing (1).

When the power switch (12) is ON, the power supply unit (11) is charged with a current equivalent to that of the light emission from each stroboscopic lamp (9), and when a trigger circuit current from the light receiver (2) or a current from the built-in trigger circuit of the still camera (7) is received by the power supply unit (11), said charge current flows to each stroboscopic lamp (9).

The light receiver (2) is a synchronous light-emission switch similar to that of the prior art, which senses only an instantaneous flash of pulse wave form from the stroboscopic light unit and thereby develops an electromotive force, which causes a switching action.

The charge pilot lamp (13) is actuated when the power supply unit (11) is charged with a current equivalent to that of the light emission from each stroboscopic lamp (9).

Operation and function of the flash device according to preferred Embodiment 1 are as follows.

EXAMPLE 1

Photography with stroboscopic unit positioned with the still camera.

For photographing a patient (K) undergoing an operation by a still camera (7) with a stroboscopic unit (8), said camera (7) is focused on the patient (K) by a routine method and then the shutter is released, after a charging of the power supply unit (11) is acknowledged by the charge pilot lamp (13) being ON with the power switch (12) being ON. At the same time the stroboscopic unit (8) of the still camera (7) emits a flash light and the direct beam (B) of the flash, the reflection (C) from the patient (K), and other light sources (including a scattered and irregular refraction) pass through the transparent cylinder (4), reaching directly the light sensing unit (2a) of the light receiver (2) or illuminating the light sensing unit (2a) of the light receiver (2) through reflection from the curved surface at the top side of the focusing reflection plate (5).

When the light falls onto the light receiver (2), said receiver (2) discharges and consequently the trigger circuit is actuated, via the power supply unit (11), with regard to each stroboscopic lamp (9), and a light-emission current flows from the power supply unit (11) to each stroboscopic lamp (9), whereupon each stroboscopic lamp (9) emits a flash, which illuminates the patient (K) under operation.

It is self-evident that the time lag between the flashing of the stroboscopic unit (8) in the still camera (7) and the flashing of the stroboscopic lamp (9) attached to the lamp housing (1) of the shadowless lamp is too short to influence the photographing operation.

For the purpose of continuously taking photographs, one only has to repeat the same process after acknowledging that the charge pilot lamp (13) is ON.

While photography is under way, the light from the shadowless lamp continues to illuminate the patient (K) under operation, but the reflection beam (A) is shielded by the underside of the focusing reflection plate (5) and is prevented from directly illuminating the light sensing unit (2a) of the light receiver (2). When photography is finished, the power switch (12) goes OFF.

EXAMPLE 2

Photography without the stroboscopic unit positioned with the still camera

For photography of the patient (K) under operation by a still camera (7) without the stroboscopic unit (8) positioned therewith, the X-contact is connected by a connection cord (not shown) to the plug (10) positioned on the side surface of the lamp housing (1).

Next after acknowledgement of the charging of the power supply unit (11) by the charge pilot lamp (13) with the power switch (12) being ON, the still camera (7) is routinely focused on the patient (K) positioned on the bed and the shutter is released.

At the same time a switch built-into the still camera (7) reacts to the shutter, causing the trigger circuit current to flow via the connecting cord and the power supply unit (11) to each stroboscopic lamp (9), and from the power supply unit (11), a light-emission current flows to each stroboscopic lamp (9) and consequently each stroboscopic lamp (9) flashes and this flash illuminates the patient (K) on the bed.

The process for continuous photographing and shielding of the primary reflection beam (A) from the shadowless lamp are the same as in Example 1.

When the photographing is finished, the power switch (12) is turned OFF and the connecting cord linking the X-contact of the still camera and the plug (10) of the lamp housing (1) are disconnected.

The arrangement and process described in Example 2 are not the main objects of the present invention but a mere illustration showing how such arrangement and process can be facilitated by the embodiment of the invention.

EMBODIMENT 2 (FIG. 5)

The focusing reflection plate (14) is fitted near the center of the underside of the lamp housing (1) for a clinical multi-unit shadowless lamp.

The focusing reflection plate (14) is semi-circular with a light receiver fixture (14a) formed at the top and a flange (14b) formed on the lower outer periphery thereof. Said flange (14b) together with the periphery of a transparent synthetic resin plate (15) is attached by a threaded shank 16 to the lamp housing (1).

To the light receiver fixture (14a) of the focusing reflection plate (14), is slidably fitted with a light sensing unit (2a) on the underside thereof which has a trigger circuit built therein.

At the center of the transparent synthetic resin plate (15) are a threaded belt (19), a light shielding plate (17), thereof and an auziliary reflection plate (18) on the top thereof.

The light receiver (2) is fitted to the fixture (14a) of the focusing reflection plate (14) such that said receiver (2) is movable in the vertical direction by turning a threaded cylindrical member (20) which is threaded with a hole (14c) located on the inside periphery of the fixture (14a) and which has the light receiver (2) fitted into the center thereof.

The focusing reflection plate (14) is designed such that a focus (F) is formed by an incident light (D) parallel to axis (CL) and the incident lights $(B_1)$ (C) (E) which originate from specific angles to the axis (CL) and are directed to the center of the light sensing unit (2a) of said light receiver (2).

The light shielding plate (17) is a metal plate large enough to prevent a strong primary reflection beam (A) originating from the direction of the patient under illumination of the shadowless lamp and to prevent other beams from directly fallong onto the focusing reflection plate (14).

The auxiliary reflection plate (18) serves to reflect the direct beam $(B_1)$ from a stroboscopic unit light flash outside of the lamp housing and the reflected light of the stroboscopic unit from the focusing reflection plate (14) and to focus these reflections onto the center (S) of the light sensing unit (2a) of the light receiver (2) and for this reason the light sensing unit (2a) has an irregular conical surface formed thereon.

The center (S) of the light sensing unit (2a) of the light receiver (2), the focus (F) of the focusing reflection plate (14), the center of the auxiliary reflection plate (18), and the center of the light shielding plate (17) are aligned with said axis (CL) and the axis (CL) is in the same direction as the illuminated field of the shadowless lamp.

The reason why it is so arranged that the focus (F) of the focusing reflection plate (14) can be brought to or away from the center of the light sensing unit (2a) of the light receiver (2), and, why the light receiver (2) is movable in the vertical direction to the fixture (14a) of the focusing reflection plate (14) is to be now described.

Generally speaking, when a patient lies on an operation table and a surgeon performs an operation on the patient, usually the shadowless lamp is set just above a plane on which the operation takes place. Thereby the operating plane is photographed by a still camera independent of the lamp housing (1) using a stroboscopic unit positioned with the camera and positioned close to the operating table.

In either case the photographing is performed at a distance from the operating table and accordingly the light beam from the stroboscopic unit positioned with the still camera falls onto the focusing reflection plate (14) and is not in parallel direction to the axis (CL) but rather at a certain angle with respect thereto. Therefore the luminous flux of directed light from the stroboscopic unit or the focused luminous flux of its reflection is naturally larger before it reaches the focus (F) of the focusing reflection plate (14). For the reason of making as much light as possible from the stroboscopic light fall onto the light sensing unit (2a) of the light receiver (2), it is sometimes desirable that the center (S) of the light receiver (2) be located at a larger distance from the focus (F) of the focusing reflection plate (14). Thus, depending on the positional relationship between the patient (K) and the still camera (7), i.e., combinations of the shooting conditions including the shooting distance, the type of lens in the still camera used and the volume of light emitted from the stroboscopic unit used in the photography, it is more desirable that the distance between the focus (F) of the focusing reflection plate (14) and the center (S) of the light sensing unit (2a) of the light receiver (2) be variable. In the latter case, the cylindrical member (20) fixing the light receiver (2) can be turned to adjust the distance accordingly.

The above is the description of the second embodiment of the present invention, but the scope of the present invention includes a vertical moving means equipped with an indicator showing the vertical distance of the light receiver (2) relative to the focusing reflection plate (14); the fitting of the light receiver (2) to the fixture (14a); and the assembly and fitting of the integrated assembly of the auxiliary reflection plate (18) and the light shielding plate (17) to the inside of the transparent synthetic resin plate (15).

The flash device illustrated in the second embodiment is the same as the one illustrated in the first embodiment.

Two differences in function between the two embodiments are recognized as follows; the first embodiment, the flash of the stroboscopic unit (8), positioned with the still camera, is reflected from the focusing reflection plate (5), and in the second embodiment the reflecting is done from two plates, i.e., the focusing reflection plate (14) and the auxiliary reflection plate (18); and in the second embodiment the distance between the focus (F) of the focusing reflection plate (14) and the center (S) of the light sensing unit (2a) of the light receiver (2) is adjustable so as to suit a particular shooting condition.

The descriptions of the first and second embodiments do not restrict the scope of the present invention but are merely illustrations of preferred embodiments.

The above-mentioned features with regard to the description and use of the present invention facilitate the following practical advantages.

Since the light of illumination from the shadowless lamp and the flash light from the stroboscopic unit positioned with a common still camera are utilized for photographing the part of a patient's body undergoing operation, desirable clinical photographs of the operation performed on the patient can be taken by a handy camera from the chosen position and angle which facilitates the best photographing conditions.

Since the light receiver reacts only to an instantaneous flash of pulse waveform which comes from the stroboscopic unit and thereby generates an electromotive force which causes a switching action and since a light shielding means is provided which prevents the incidence of the primary reflection beam from the illuminated field of the shadowless lamp onto the light sensing unit of the light receiver, saturation of the sensing performance in the light receiver can be avoided thus making the action of the light receiver reliable thereby not causing inadvertent action of the flash device due to light other than the flash.

The combined use of a light shielding means and a focusing reflection plate facilitates a simple constitution of the present invention and makes it easy to apply the flash device of the present invention to already existing shadowless lamp.

Since the focusing reflection means comprises a focusing reflection plate and an auxiliary reflection plate, the direct light and the reflection of the stroboscopic unit positioned outside the lamp housing of the shadowless lamp can be focused onto the light receiving means, thereby assuring a more dependable switching action of the light receiving means.

Since the focus of the focusing reflection plate and the light sensing unit of the light receiving means can be moved toward or away from each other, the light sensing unit of the light receiving means can be moved to a position thereby allowing the highest focusing rate, i.e., to a position where as much of the direct light and the reflection of the stroboscopic unit positioned outside the lamp housing of the shadowless lamp can be concentrated as a function of the shooting distance, the type of lens used in the still camera and the amount of light from the stroboscopic unit.

When a transparent cylinder is used to cover the light receiving means and the focusing reflection means, both the means can be protected; dust can be prevented from collecting on the top side of the focusing reflection means or from falling onto the patient being operated on; the reflecting surface of the focusing reflection means or the light sensing surface of the light receiving means can be substantially prevented from deteriorating, which ensures prolonged effective performance of the device.

In the case where the light receiving means and the focusing reflection means is positioned in a lamp housing and their undersides are covered with a transparent plate, there is in addition to the advantage of the two means being protected, the advantages that the manipulation of the shadowless lamp is unrestricted because there are no projections from the lamp housing; and that the shadowless lamp is safe to handle and has an attractive appearance.

What is claimed is:

1. A flash device positioned in a lamp housing of a shadowless lamp and for use with a camera located outside of the lamp housing which has a stroboscopic light unit positioned therewith, said flash device comprising:
    a light emission means for illuminating a field of which a photograph is to be taken;
    a power supply means operatively associated with said light emission means for providing power thereto;
    a light receiving means operatively associated with said power supply means for activating said power supply means in response to receiving an illumination by a flash of light from the stroboscopic light unit;
    a focusing light reflection means operatively associated with said light receiving means for focusing direct and reflected light from the stroboscopic light unit to a focal point and thereby allowing said light receiving means to receive illumination by a flash of light from the stroboscopic light unit; and
    a light shielding means operatively associated with said light receiving means for preventing reflected light from the shadowless lamp from being received by said light receiving means and thereby preventing the activation of said power supply means in response to illumination by light from the shadowless lamp.

2. A flash device as claimed in claim 1, wherein said light receiving means has a light sensing unit.

3. A flash device as claimed in claim 2, said light sensing unit being a photo cell.

4. A flash device as claimed in claim 1, wherein said light receiving means has a light sensing unit, said light sensing unit being located adjacent the underside of the lamp housing, and said light shielding means being located beneath said light sensing unit.

5. A flash device as claimed in claims 1 or 4, wherein said focusing light reflection means comprises:
    a substantially semi-circular reflecting plate for reflecting light from the stroboscopic light unit to the focal point; and
    a secondary reflecting plate operatively associated with said semi-circular reflecting plate for reflecting light from the stroboscopic light unit and from said semi-circular reflecting plate to the focal point.

6. A flash device as claimed in claim 1, wherein said light receiving means is movable toward and away from the focal point.

7. A flash device as claimed in claims 1 or 4, further comprising a transparent plate positioned with said light receiving means and said focusing light reflection means positioned on one side thereof and the light emission means is positioned on the other side thereof.

8. A flash device as claimed in claim 1, further comprising:
    a transparent plate;
    said focusing light reflecting means being positioned between said light receiving means and said light shielding means; and
    said transparent plate being positioned between said focusing light reflecting means and said light shielding means.

* * * * *